(12) United States Patent
Walter et al.

(10) Patent No.: US 9,056,540 B2
(45) Date of Patent: Jun. 16, 2015

(54) DRIVE DEVICE FOR A ROOF MODULE OF A MOTOR VEHICLE

(71) Applicants: Herbert Walter, Ebersbach (DE); Michael Heidan, Stuttgart (DE); Ulrich Mueller-Boysen, Esslingen (DE); Tobias Waibel, Ulm (DE); Markus Singer, Plochingen (DE); Han Joo Sung, Seoul (KR); Kunho Kim, Seoul (KR)

(72) Inventors: Herbert Walter, Ebersbach (DE); Michael Heidan, Stuttgart (DE); Ulrich Mueller-Boysen, Esslingen (DE); Tobias Waibel, Ulm (DE); Markus Singer, Plochingen (DE); Han Joo Sung, Seoul (KR); Kunho Kim, Seoul (KR)

(73) Assignee: BOS GMBH & CO. KG, Ostfildern (DE)

(*) Notice: Subject to any disclaimer, the term of this patent is extended or adjusted under 35 U.S.C. 154(b) by 0 days.

(21) Appl. No.: 14/316,948

(22) Filed: Jun. 27, 2014

(65) Prior Publication Data

US 2015/0001896 A1    Jan. 1, 2015

(30) Foreign Application Priority Data

Jun. 28, 2013    (DE) .......................... 10 2013 212 576

(51) Int. Cl.
*B60J 7/057*    (2006.01)

(52) U.S. Cl.
CPC ..................................... *B60J 7/0573* (2013.01)

(58) Field of Classification Search
CPC ........................................................ B60J 7/0573
USPC ........................................................... 296/223
See application file for complete search history.

(56) References Cited

U.S. PATENT DOCUMENTS 4,619,480 A * 10/1986 Motoyama et al. ........... 296/217
8,690,235 B2 * 4/2014 Lee et al. ...................... 296/214

FOREIGN PATENT DOCUMENTS

| DE | 35 45 869 A1 | 10/1986 | |
|---|---|---|---|
| DE | 4318481 | * 12/1994 | ............... B60K 1/00 |
| DE | 198 23 730 A1 | 12/1999 | |
| DE | 60 2004 011 473 T2 | 1/2009 | |
| EP | 1 588 882 A1 | 10/2005 | |
| GB | 2 172 932 A | 10/1986 | |

* cited by examiner

*Primary Examiner* — Dennis H Pedder
(74) *Attorney, Agent, or Firm* — Flynn, Thiel, Boutell & Tanis, P.C.

(57) ABSTRACT

A drive device for a roof module of a motor vehicle. A drive device of this type, the roof module comprising two movable roof parts, with longitudinally extended tension/compression means for transmitting drive to the roof parts which are driveable by a common drive motor via two output pinions, is known. The output pinions are oriented coaxially with respect to each other, and the output pinions are assigned a change-over device which sets the drive motor into operative connection alternatively with the one or the other output pinion.

13 Claims, 8 Drawing Sheets

DRIVE DEVICE FOR A ROOF MODULE OF A MOTOR VEHICLE

CROSS REFERENCE TO RELATED APPLICATION

This application claims the priority of the German patent application DE 102013212576.3, the disclosure of which is hereby incorporated into this application.

FIELD OF THE INVENTION

The invention relates to a drive device for a roof module of a motor vehicle, the roof module comprising two movable roof parts, with longitudinally extended tension/compression means for transmitting drive to the roof parts which are driveable by a common drive motor via two output pinions which are assigned to the tension/compression means for the movable roof part.

BACKGROUND OF THE INVENTION

A drive device of this type is known from DE 35 45 869 C2 or DE 198 23 730 A1. The roof module has two movable roof parts which are shiftable relative to the roof module between opening and closed positions with the aid of drive transmission cables. The drive transmission cables are driven by in each case one output pinion for each roof part, with the two output pinions being assigned to a common drive motor. In order to activate the two output pinions by means of the common drive motor, a distributing gearing is provided in DE 35 45 869 C2. In DE 198 23 730 A1, the transmission of drive from the common drive motor to one of the two output pinions is changed over via an electromagnetic change-over device.

SUMMARY OF THE INVENTION

It is the object of the invention to provide a drive device of the type mentioned at the beginning, which is constructed in a simple manner and is designed in a space-saving manner.

Movable roof parts within the context of the invention can be dimensionally stable roof parts or else flexible sheetlike structures, such as, in particular, shading structures for the roof module. Output pinions within the context of the invention are output elements which transmit driving forces to the corresponding tension/compression means in a form-fitting and/or frictional manner. The output pinions are particularly advantageously formed by gear wheels. The tension/compression means are preferably flexible drive transmission cables in the form of flexible shafts which convert a rotational movement of a corresponding output pinion into a longitudinal displacement of the corresponding drive transmission cable. The orientation according to the invention of the two output pinions coaxially with respect to each other permits a particularly space-saving arrangement of the output pinions and, accordingly, a compact assignment of the change-over device. An electric motor is preferably provided as the common drive motor.

In a refinement of the invention, the change-over device comprises a mechanical distributor gearing which comprises a planetary gearing. This is a robust and fail-safe embodiment.

In a further refinement of the invention, the distributor gearing comprises two mutually coaxial crown wheels which are arranged in a common plane and are in each case assigned to an output train. An output train is to be understood as meaning the transmission of the driving force from the common drive motor to one output pinion in each case. The crown wheels are gear wheels which have an annular toothed ring on the outer circumference of a circular end surface of the respective disk-shaped gear wheel. The two drive trains which lead into the drive pinions can be fixed independently of each other, i.e. kept at a standstill, by a corresponding adjustment element of the change-over device.

In a further refinement of the invention, the crown wheels are stoppable in an alternating manner via an adjustment element which is adjustable radially with respect to an axis of rotation of the crown wheels, in particular a toothed cam element. Depending in each case on the position, the toothed cam element engages in each case one toothed ring of the two crown wheels. The toothed cam element is kept in a stationary manner in the respective blocking position.

In a further refinement of the invention, a planet carrier of the planetary gearing is connected to an output pinion for rotation therewith. In a further refinement, one crown wheel is connected to a ring gear for rotation therewith, said ring gear meshing with planet wheels of the planet carrier. In a further refinement of the invention, the other output pinion is connected to the crown wheel and to the ring gear for rotation therewith. The two output pinions are arranged coaxially and directly axially adjacent to each other. Owing to the fact that the one output pinion is driven via the planet carrier and the other output pinion is driven via the planet wheels, which are mounted rotatably on the planet carrier, a particularly space-saving design of the distributor gearing is ensured.

In a further refinement of the invention, the crown wheel and the ring gear form an integral component. The component constitutes a gear wheel which is provided on one side with an axially protruding toothed ring and on the other side with a toothed ring projecting radially inward (with respect to an axis of rotation of the gear wheel). The planet wheels mesh with the radially inwardly projecting toothed ring. The axially protruding toothed ring is acted upon by the toothed cam element. The two crown wheels have toothed rings protruding coaxially with respect to each other in the same axial direction. The division of the two toothed rings is designed in such a manner that the toothed cam element which is adjustable radially with respect to the teeth of the toothed rings of the crown wheels permits a secure and form-fitting blocking for one of the two crown wheels in each case.

In a further refinement of the invention, the other output pinion is connected to the crown wheel and to the ring gear for rotation therewith. If the output pinion has not been stopped, the output train for said output pinion therefore runs via the planet carrier, the planet wheels, the ring gear and the crown wheel, with ring gear and crown wheel forming the integral gear wheel.

In a further refinement of the invention, the change-over device comprises at least one electromagnetically switchable coupling unit. The coupling unit is switched as a function of corresponding control signals for opening or closing the at least one roof part of the roof module.

In a further refinement of the invention, the output pinions are spaced apart coaxially with respect to each other, and the electromagnetically switchable coupling unit is arranged axially between the two output pinions. As a result, the coupling unit is positioned in a space-saving manner between the two output pinions. The changing over from the one output train to the other can take place in a particularly simple manner.

In a further refinement of the invention, the coupling unit has an axially movable coupling slide which is connected in a rotationally locked manner to a motor gearing of the drive motor, wherein the coupling slide is provided on opposite axial sides with magnetically effective coupling surfaces which interact with in each case one electrically activatable magnetic field in the region of the output pinion. The magnetic field can be generated by an electromagnetic coil in the region of each output pinion. Energizing of the electromagnetic coil causes the coupling slide to be attracted, and moves axially into the engagement position with the assigned output pinion.

In a further refinement of the invention, the output pinions and the coupling surfaces of the coupling slide have mutually complementary profiled surfaces which, when the coupling slide is coupled axially to in each case one output pinion, ensure a rotationally locked connection between coupling slide and output pinion. In the event of a corresponding axial displacement, the coupling slide engages in a form-fitting manner with the respective output pinion via the complementary profiled surfaces, and therefore torque can be transmitted from the motor gearing of the drive motor to the output pinion in a play-free manner. The motor gearing of the drive motor preferably has a gear wheel which coaxially surrounds the coupling slide and is connected in a rotationally locked manner to the coupling slide. The gear wheel is fixed in the axial direction. At the same time, however, the gear wheel does not obstruct the axial moveability of the coupling slide.

In a further refinement of the invention, a control unit which activates the change-over device as a function of an opening or closed state of the roof parts is provided. In the case of the change-over device which comprises the mechanical distributor gearing, the control unit activates the distributor gearing via the corresponding mechanical adjustment element in such a manner that one output train in each case can be blocked. In the case of the change-over device which contains the electromagnetically switchable coupling unit, activation takes place by means of an electric or electronic control unit, in both cases as a function of corresponding opening and closing operations of the movable roof parts of the roof module.

BRIEF DESCRIPTION OF THE DRAWINGS

Further advantages and features of the invention emerge from the claims and from the description below of preferred exemplary embodiments of the invention that are illustrated with reference to the drawings.

FIG. 6b shows a further illustration of a partial region of the drive device similar to FIG. 6a.

DETAILED DESCRIPTION

Figures 1, 2:
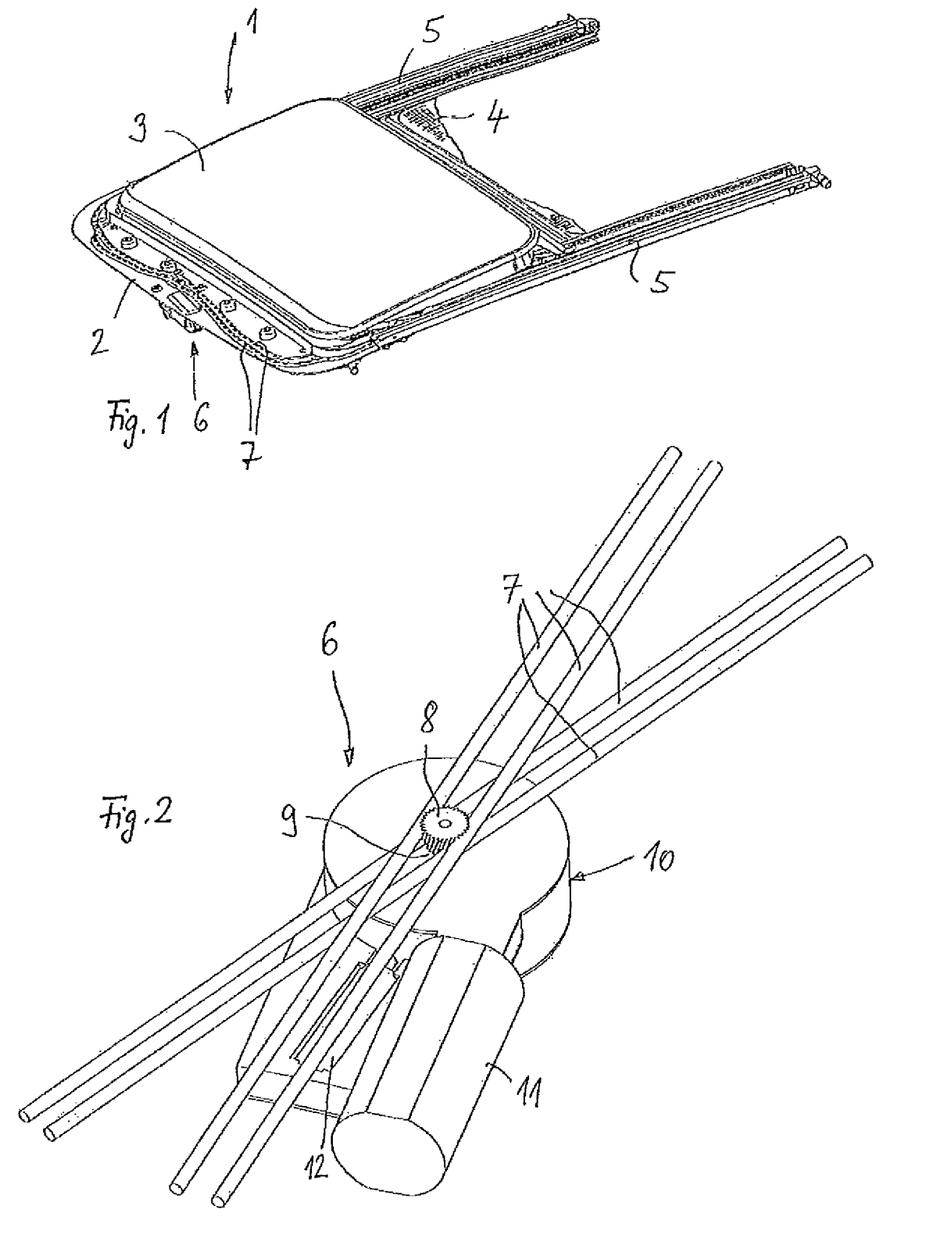
FIG. 1 shows schematically an illustration of a roof module for a passenger motor vehicle with an embodiment of a drive device according to the invention.
FIG. 2 shows, in an enlarged illustration, the drive device for the roof module according to FIG. 1.
Figure 3:
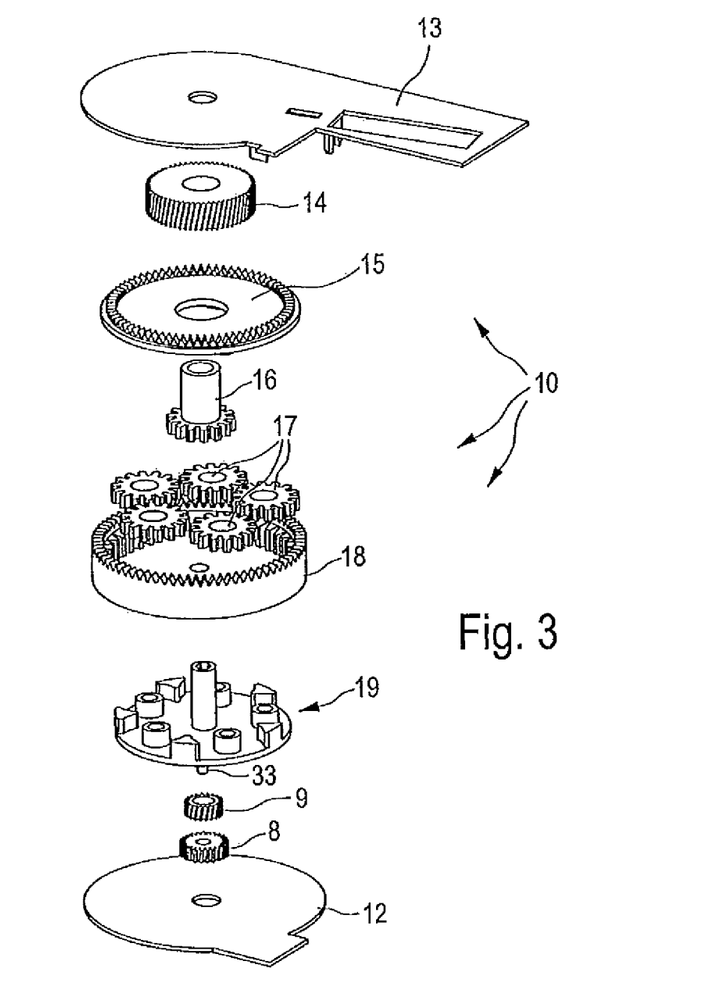
FIG. 3 shows, in an exploded illustration, a part of the drive device according to FIG. 2.

A roof module 1 according to FIG. 1 is inserted into a roof aperture in a roof region of a passenger motor vehicle and fitted there. The roof module 1 has a dimensionally stable supporting frame 2 which is provided on opposite longitudinal sides with dimensionally stable guide rails 5 for the shifting of a first, dimensionally stable roof part 3 in the form of a glass roof. In addition, a further roof part 4 in the form of a flexible shading structure, which is provided on the end side with a dimensionally stable pull-out profile, is displaceable along the guide rails 5. The two roof parts 3, 4 are moved by a drive device 6, 7. The drive device 6, 7 comprises drive transmission cables 7 which are designed as flexible shafts transmitting tension and compression. The flexible shafts are also referred to as threaded shafts, since the outer casing thereof is provided with a helical profiling.

In a first embodiment according to FIGS. 2 to 8, the drive device 6 comprises a mechanical distributor gearing which is accommodated in a housing. The distributor gearing is operatively connected to an electric drive motor 11 and transmits the driving forces of the drive motor 11 to two output pinions 8 and 9 which are in each case assigned to a pair of drive transmission cables 7, as can be gathered from FIG. 2. The drive transmission cables 7 act laterally on the respective roof parts 3, 4 in order to shift the roof parts 3, 4 between the opening and closed positions thereof. The closed position in the case of the shading structure is the shading position.

Figure 4:
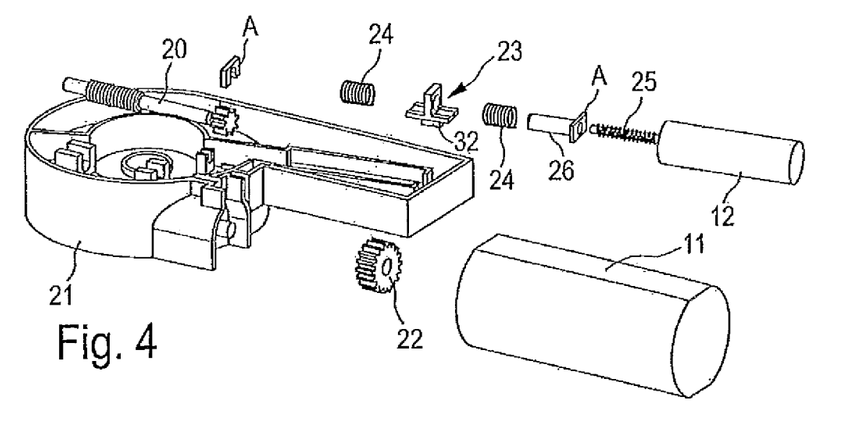
FIG. 4 shows, likewise in an exploded illustration, a further part of the drive device according to FIG. 2.
Figure 5:
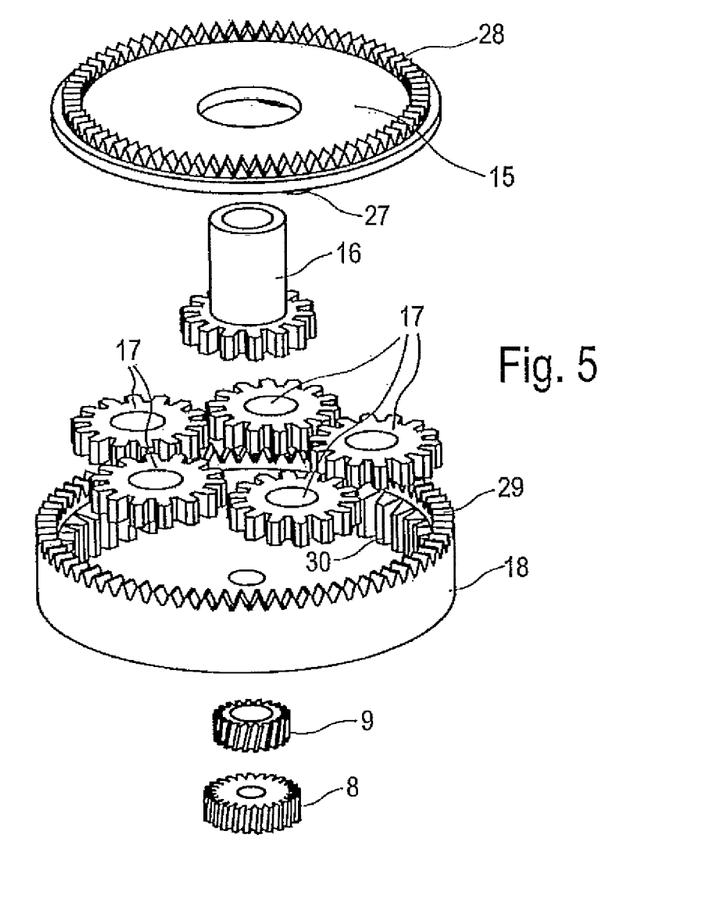
FIG. 5 shows, in an enlarged exploded illustration, a distributor gearing of the drive device according to FIGS. 2 to 4.
Figure 6A:
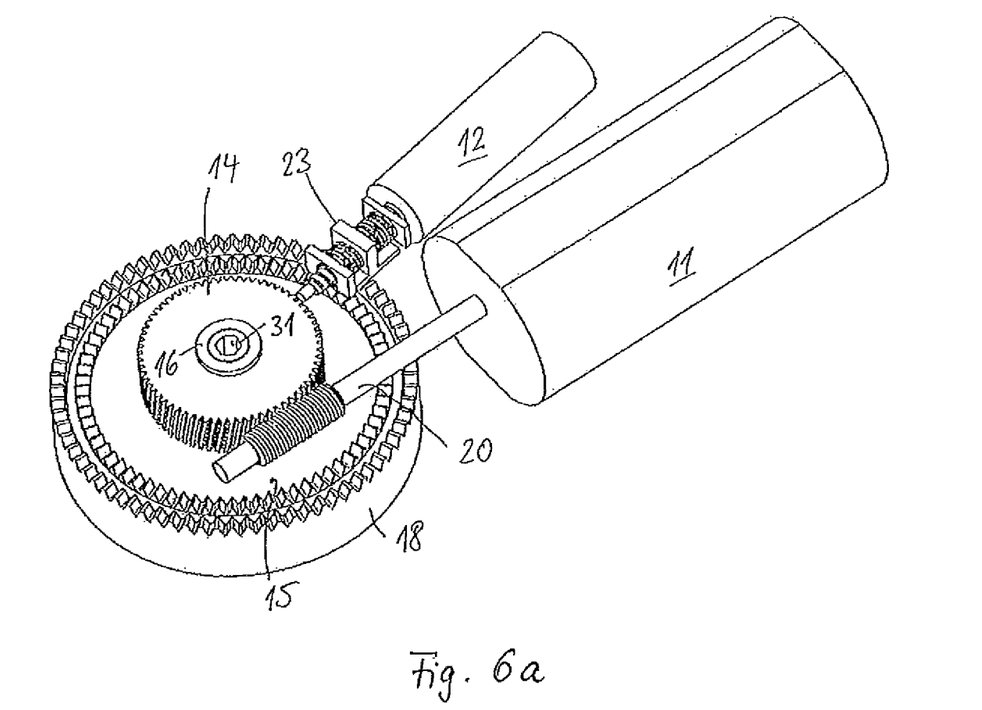
FIG. 6a shows schematically an illustration of a partial region of the drive device.
Figure 6B:
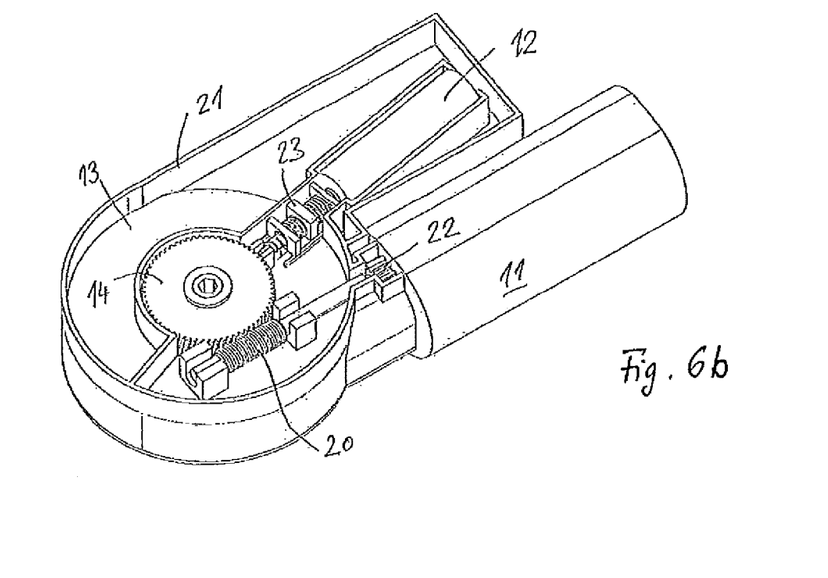
Figure 7:
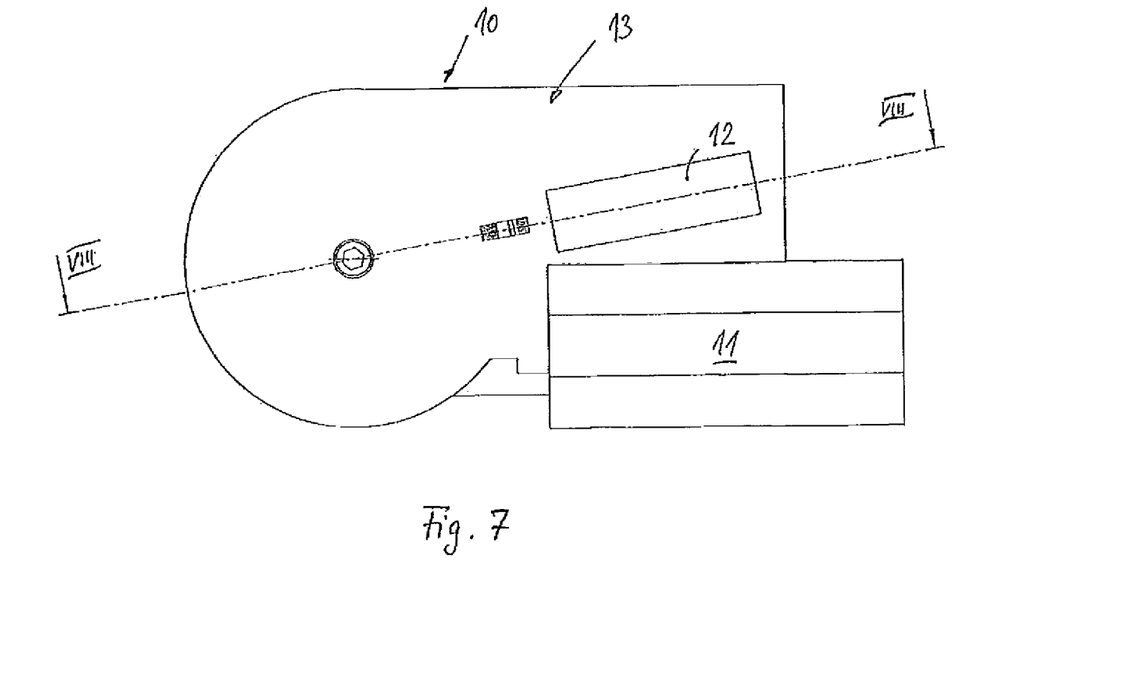
FIG. 7 shows a top view of the drive device.
Figure 8:
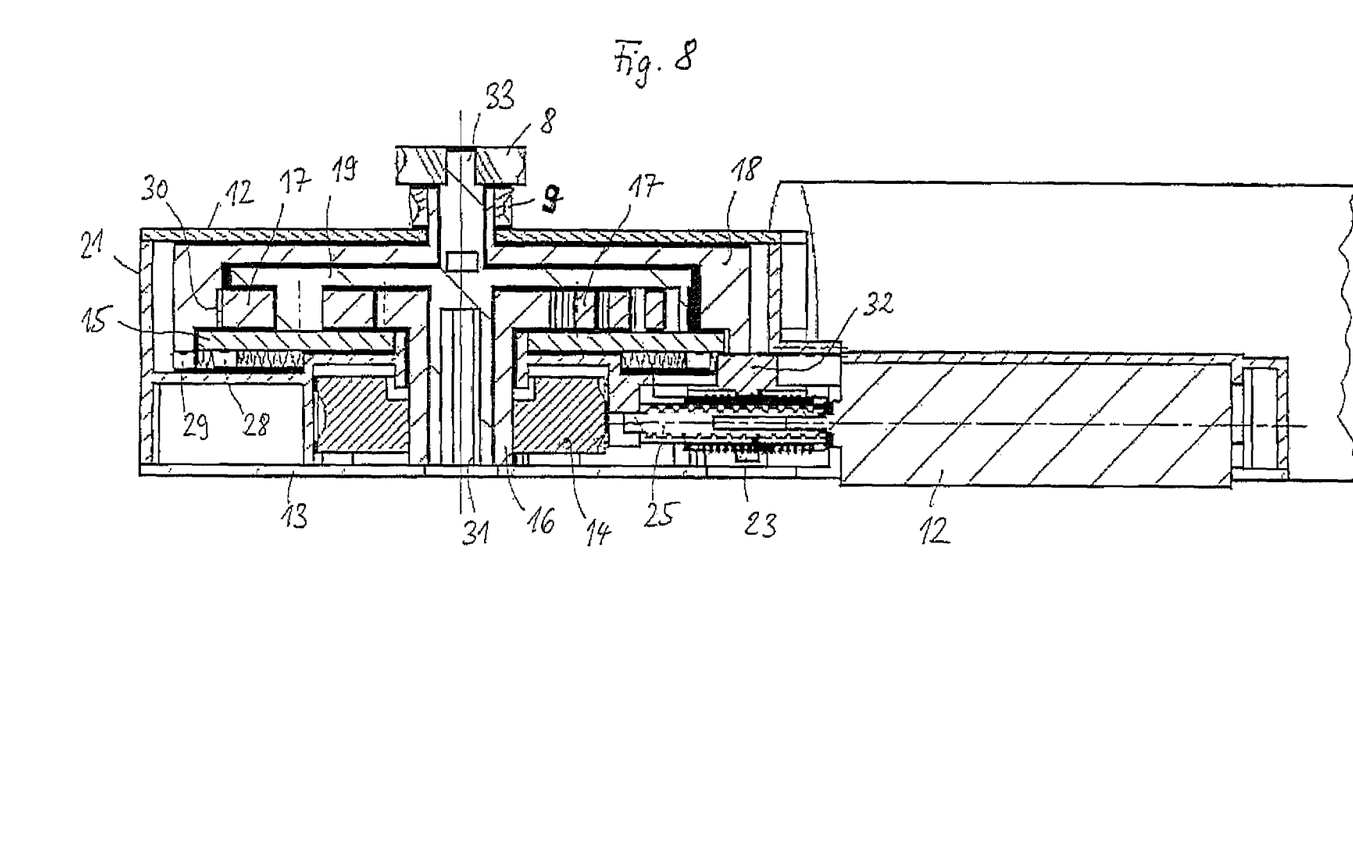
FIG. 8 shows, in an enlarged illustration, a section through the drive device according to FIG. 7 along the intersecting line VIII-VIII in FIG. 7.

The drive device 6 is provided in order alternatively to drive the two output shafts 8, 9. For this purpose, a change-over device 10 which, in the embodiment according to FIGS. 2 to 8, comprises the mechanical distributor gearing is provided. The driving force of the drive motor 11 is divided there into two output trains, each of which is assigned one of the two output pinions 8, 9. The change-over device 10 according to FIGS. 3 to 8 has a housing 12, 13, 21 in which the distributor gearing is accommodated. The drive motor 11 has a drive shaft on which a drive pinion 22 is fastened (FIG. 4). The drive pinion uses a gear wheel transmission to drive a worm wheel 20 which meshes with a drive gear wheel 14, which is designed as a spur gear wheel, of the distributor gearing (see FIGS. 4 and 6a). The drive gear wheel 14 is connected to a sun wheel 16 of a planetary gearing for rotation therewith. Coaxially with respect to the sun wheel 16, a planet carrier 19 is mounted rotatably relative to the sun wheel 16 and the drive gear wheel 14. The end of the planet carrier that is opposite the drive gear wheel 14 bears the output pinion 8 in a rotationally locked manner by means of a square pin. The end 33 of the planet carrier 19 protrudes outward through a housing cover 12 of the housing 12, 13, 21 coaxially with respect to a central axis of rotation of the distributor gearing (see FIG. 8) such that the output pinion 8 is positioned outside the housing 12, 13, 21. A part of the planet carrier 19 that is in the form of a circular disk has journals for a plurality of planet wheels 17, as can be seen with reference to FIGS. 3 and 8. The planet wheels are mounted rotatably on the journals of the planet carrier 19. All of the planet wheels 17 mesh with a serration of the sun wheel 16 which is mounted rotatably coaxially with respect to the central axis of rotation of the distributor gearing on a bearing sleeve protruding in an opposed manner to the end 33. That end of the bearing sleeve which is opposite the output pinion 8 has a cavity which is open toward the end and is provided on the inside with tool engagement surfaces 31. The tool engagement surfaces 31 serve in an emergency to enable emergency actuation of the distributor gearing and therefore of the input pinions 8, 9, by means of a suitable tool, such as an Allen key or the like.

The planet carrier 19 is axially embedded in a crown wheel 18 which is provided with an axially protruding toothed ring 29 in the region of an end side. In addition, the crown wheel 18 is provided with a further, radially inwardly projecting toothed ring 30 level with the planet wheels 17. The planet wheels 17 mesh with said internal toothing formed by the radially inwardly projecting toothed ring. In addition, a further crown wheel 15 which is connected in a rotationally locked manner via vertical journals 27 to the journals of the planet carrier 19 is embedded in the crown wheel 18. A toothed ring 28 of the crown wheel 15 is arranged in the same radial plane—with respect to the central axis of rotation of the distributor gearing—as the toothed ring 29 of the crown wheel 18. The crown wheel 15 is embedded axially in the crown wheel 18, as can be gathered from FIGS. 6a and 8. The two toothed rings 28 and 29 of the two crown wheels 15 and 18 can be stopped alternately by an adjustment unit 12 which, via a threaded worm 25, axially adjusts an adjustment element 23 in the form of a toothed cam element provided with a toothed cam 32. The adjustment element 23 is guided in a linearly movable manner in the housing 12, 13, 21 in such a manner that a rotational movement of the threaded worm 25 results in a linear adjustment of the adjustment element 23. The linear guide for the adjustment element 23 is oriented radially with respect to the central axis of rotation of the distributor gearing, as can be gathered from FIGS. 6a and 8. The orientation is undertaken in such a manner that the toothed cam 32 of the adjustment element 23 engages in each case in one of the two toothed rings 28, 29 of the crown wheels 15, 18, depending on the adjustment position of the adjustment element 23. The adjustment element 23 is not linearly adjusted directly by transmission of torque between the threaded worm 25 and adjustment element 23. On the contrary, the threaded worm 25 is screwed to a threaded sleeve 26, with the adjustment element 23 being pushed onto the outer side of said threaded sleeve and being displaceable relative to the threaded sleeve 26. The displaceability of the adjustment element 23 on the threaded sleeve 26 is formed by two axial stops A which are fixed on the threaded sleeve 26. In addition, the adjustment element 23 is held in a central position between the two stops A by two helical compression springs 24. The adjustment element 23 is therefore mounted in a floating manner on the outer casing of the threaded sleeve 26. Owing to the linear guidance of the threaded sleeve 26 in corresponding guide profilings of the housing 21, a rotational movement of the threaded worm 25 inevitably results in a linear movement of the threaded sleeve 26, as a result of which the adjustment element 23 is inevitably also entrained. The helical compression springs 24 are pretensioned and, in conjunction with the stops A, limit the adjustment distance of the adjustment element 23 on the threaded sleeve 26. The adjustment distance of the threaded sleeve 26 itself is limited by corresponding revolutions of the threaded worm 25 of the adjustment unit 12. The adjustment unit 12 has an electric motor as the adjustment drive.

If the radially outer toothed ring of the crown wheel 18 is then fixed by the toothed cam 32 of the adjustment element 23, the output pinion 9 is inevitably blocked in respect of a rotational movement. Said output pinion is likewise stopped. Accordingly, a rotational movement of the drive gear wheel 14 that is caused by the drive motor 11 is transmitted via the sun wheel 16 to the planet wheels 17, which roll along the stopped toothed ring 30 of the crown wheel 18 and thus cause the planet carrier 19 to rotate. As a result, the output pinion 8, which is rotationally locked to the planet carrier 19, inevitably also rotates. If, alternatively, the outer toothed ring 29 is then released and the inner toothed ring 28 of the crown wheel 15 is fixed by the adjustment element 23, the following sequence of movement arises: owing to the stopping of the crown wheel 15, the planet carrier 19 inevitably also stops, and therefore the output pinion 8 is blocked in respect of a rotational movement. A rotational movement of the drive gear wheel 14 results in a rotational movement of the sun wheel 16 which meshes with the planet wheels 17. Since the planet carrier 19 is stopped, i.e. is blocked in respect of a rotational movement, the rotations of the planet wheels 17 inevitably, via the meshing with the toothed ring 30 located radially on the inside, bring about a rotational movement of the crown wheel 18, which is connected in a rotationally locked manner to the output pinion 9. Accordingly, the output pinion 9 is caused to rotate.

The toothed cam element 32 of the adjustment element 23 can also stop the two toothed rings 28 and 29 simultaneously. The two output pinions 8, 9 are then automatically blocked in respect of a rotational movement. Finally, the toothed cam element 32 of the adjustment element 23 can also release the two toothed rings 28 and 29 in respect of a rotational movement. In this position, the drive gear wheel 14 drives the two output trains of the two output pinions 8, 9.

Figure 9:
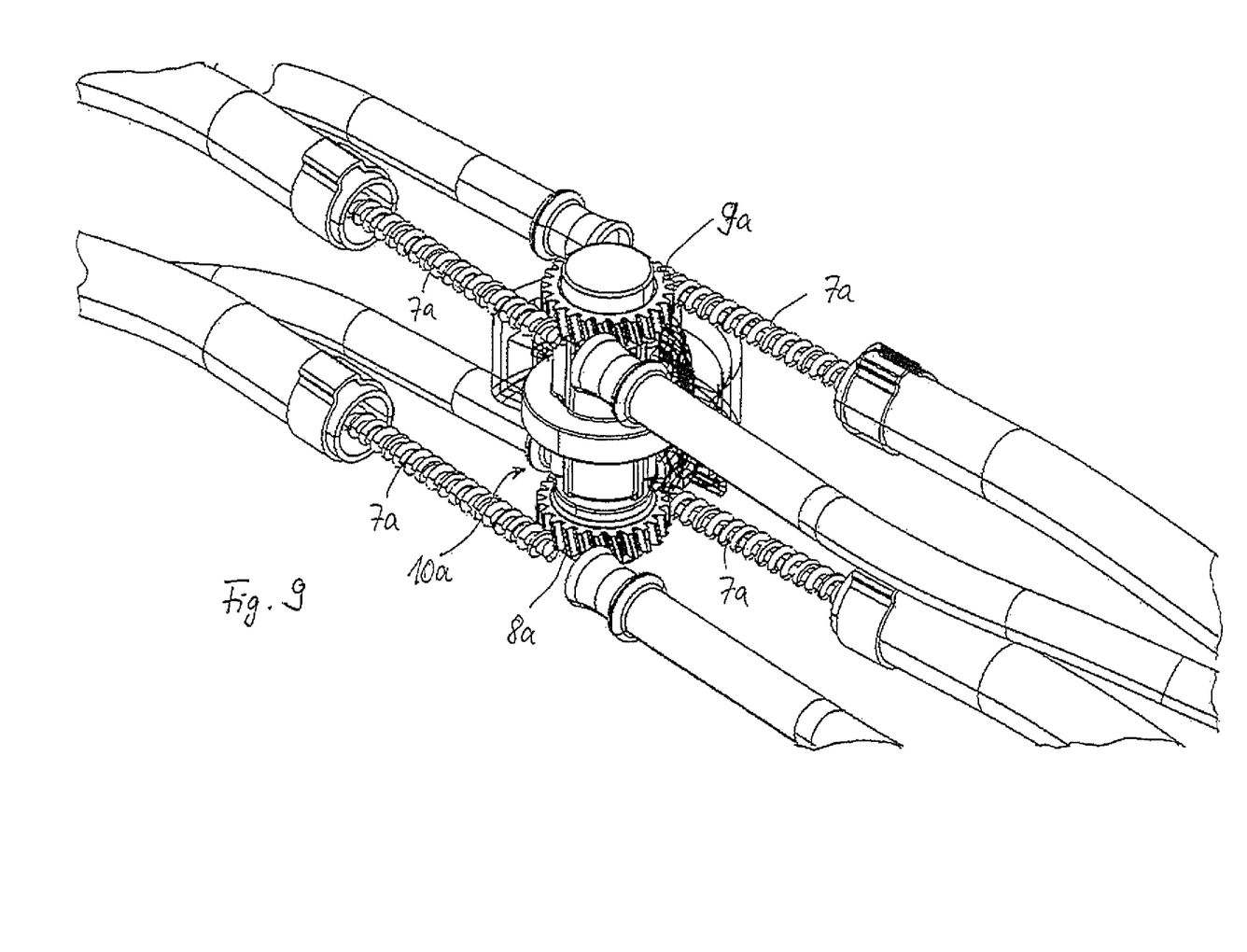
FIG. 9 shows, in a perspective illustration, a further embodiment of a drive device according to the invention for a roof module according to FIG. 1.
Figure 10:
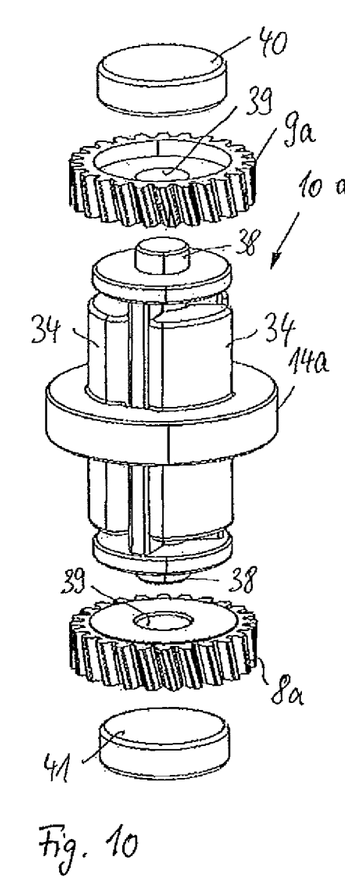
FIG. 10 shows, in a exploded illustration, a part of the drive device according to FIG. 9.
Figure 11:
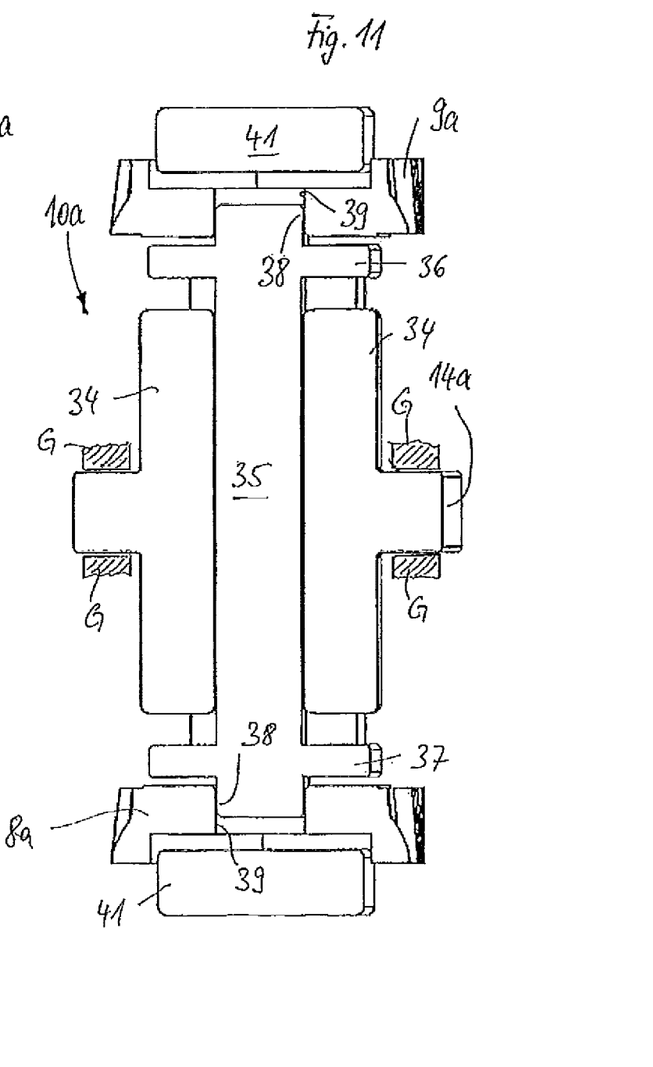
FIG. 11 shows a sectional illustration of the part of the drive device according to FIG. 10 with hatching omitted.

In the embodiment according to FIGS. 9 to 11, a drive device 6 is basically constructed in the same manner as the drive device 6 according to FIG. 1. In order to avoid repetitions, reference is therefore made to the explanations with regard to FIG. 1. The substantial difference is that, in the case of the embodiment according to FIGS. 9 to 11, the change-over device 10a comprises an electromagnetically switchable coupling unit. This drive device is also again provided with two output pinions 8a, 9a which are arranged coaxially with respect to each other and are operatively connected to corresponding drive transmission cables 7a in order to permit corresponding shifts of the roof parts 3, 4. The two output pinions 8a, 9a are spaced apart coaxially with respect to each other—with respect to a central axis of rotation of the change-over device 10a. The change-over device 10a has a coupling unit 34 to 38. The coupling unit is connected in a rotationally locked manner to a drive gear wheel 14a which surrounds the coupling unit coaxially with respect to an axis of rotation of the output pinions 8a, 9a. The drive gear wheel 14a is mounted axially in the center between the output pinions 8a and 9a. For this purpose, housing bearing supports G which prevent displacement of the drive gear wheel 14a coaxially with respect to the axis of rotation of the output pinions 8a, 9a are provided. Guide members 34 of the coupling unit are connected in a rotationally locked manner to the drive gear wheel 14a, said guide members guiding a guide slide 35 in an axially movable manner between each other. The coupling slide 35 is mounted in a rotationally locked, but axially movable manner in the guide channel formed by the guide members 34. The coupling slide 35 protrudes towards both axial end sides beyond the guide members 34. The coupling slide 35 is provided with one magnetizable coupling disk 36, 37 on each of said axial end regions. Each coupling disk 36, 37 has an axially outwardly protruding coupling extension 38 which can enter in a form-fitting or frictional manner into a respective coupling receptacle 39 of the assigned output pinion 8a, 9a.

In addition, the end side of each output pinion 8a, 9a opposite the coupling disk 36, 37 is assigned an electromagnetic coil 41 which can generate a magnetic field which can draw the respective coupling disk 36, 37 axially against the assigned output pinion 9a, 8a and can thus produce a rotationally locked connection between the coupling slide 35 and the output pinion 8a, 9a. In the illustration according to FIG. 11, the coupling slide 35 is held in an intermediate position in which said coupling slide is operatively connected to the two output pinions 8a, 9a. This intermediate position can be maintained by springs (not illustrated). As soon as one of the two electromagnetic coils 41 is then energized, the magnetic field which has been produced inevitably draws the coupling slide 35 in the direction of the output pinion 8a, 9a of the activated coil 41. As a result, the coupling extension 38 is inevitably disengaged in the region of the opposite output pinion because of the axial displacement of the coupling slide 35, and therefore only one of the two output pinions 8a, 9a is still driven.

A control unit is provided both for the adjustment of the adjustment unit 12, in the embodiment according to FIGS. 2 to 8, and for the energizing of the electromagnetic coils 41 according to FIGS. 9 to 11, but said control unit is not specifically illustrated for the two embodiments.

The invention claimed is:

1. A drive device for a roof module of a motor vehicle, the roof module comprising two movable roof parts, with longitudinally extended tension/compression means for transmitting drive to the roof parts which are driveable by a common drive motor via two output pinions which are assigned to the tension/compression means for the movable roof parts, the output pinions being oriented coaxially with respect to each other, and the output pinions being assigned a change-over device which sets the drive motor into operative connection alternatively with the one and/or the other output pinion.

2. The drive device as claimed in claim 1, wherein the change-over device comprises a mechanical distributor gearing which has a planetary gearing.

3. The drive device as claimed in claim 2, wherein the distributor gearing comprises two mutually coaxial crown wheels which are arranged in a common plane and are in each case assigned to an output train.

4. The drive device as claimed in claim 3, wherein the crown wheels are stoppable in an alternating manner via an adjustment element which is adjustable radially with respect to an axis of rotation of the crown wheels.

5. The drive device as claimed in claim 2, wherein a planet carrier of the planetary gearing is connected to one output pinion for rotation therewith.

6. The drive device as claimed in claim 3, wherein one crown wheel is connected to a ring gear for rotation therewith, said ring gear meshing with planet wheels of a planet carrier of the planetary gearing.

7. The drive device as claimed in claim 6, wherein the crown wheel and the ring gear form an integral component.

8. The drive device as claimed in claim 6, wherein the other output pinion is connected to the crown wheel and to the ring gear for rotation therewith.

9. The drive device as claimed in claim 1, wherein the change-over device comprises at least one electromagnetically switchable coupling unit.

10. The drive device as claimed in claim 9, wherein the output pinions are spaced apart coaxially with respect to each other, and wherein the electromagnetically switchable coupling unit is arranged axially between the two output pinions.

11. The drive device as claimed in claim 9, wherein the coupling unit has an axially movable coupling slide which is connected in a rotationally locked manner to a motor gearing of the drive motor, wherein the coupling slide is provided on opposite axial sides with magnetically effective coupling surfaces which interact with in each case one electrically activatable magnetic field in the region of each output pinion.

12. The drive device as claimed in claim 11, wherein the output pinions and the coupling surfaces of the coupling slide have mutually complementary profiled surfaces which, when the coupling slide is coupled axially to the output pinions, ensure a rotationally locked connection between the coupling slide and the output pinions.

13. The drive device as claimed in claim 1, wherein a control unit which activates the change-over device as a function of an opening or closed state of the roof parts is provided.

* * * * *